(12) United States Patent
Zeng et al.

(10) Patent No.: US 9,515,356 B2
(45) Date of Patent: Dec. 6, 2016

(54) BATTERY MODULE

(75) Inventors: Zhiliang Zeng, Shenzhen (CN); Weixin Zheng, Shenzhen (CN); Jianhua Zhu, Shenzhen (CN)

(73) Assignee: BYD Company Limited, Shenzhen, Guangdong (CN)

(*) Notice: Subject to any disclaimer, the term of this patent is extended or adjusted under 35 U.S.C. 154(b) by 1399 days.

(21) Appl. No.: 13/313,278

(22) Filed: Dec. 7, 2011

(65) Prior Publication Data

US 2012/0148876 A1    Jun. 14, 2012

(30) Foreign Application Priority Data

Dec. 8, 2010 (CN) .......................... 2010 1 0581609

(51) Int. Cl.
| | |
|---|---|
| *H01M 10/48* | (2006.01) |
| *H01M 10/42* | (2006.01) |
| *H01M 2/20* | (2006.01) |
| *H01M 10/04* | (2006.01) |

(52) U.S. Cl.
CPC ........... *H01M 10/486* (2013.01); *H01M 2/206* (2013.01); *H01M 10/4257* (2013.01); *H01M 10/48* (2013.01); *H01M 10/482* (2013.01); *H01M 10/0468* (2013.01)

(58) Field of Classification Search
CPC .............. H01M 10/42–10/54; H01M 10/0468; H01M 2/202; H01M 2200/00
USPC ........................................................... 429/7
See application file for complete search history.

(56) References Cited

U.S. PATENT DOCUMENTS

| | | | |
|---|---|---|---|
| 2003/0108786 A1* | 6/2003 | Aaltonen | ............ H01M 2/1066 |
| | | | 429/61 |
| 2009/0154048 A1 | 6/2009 | Jang et al. | |
| 2010/0062329 A1 | 3/2010 | Muis | |
| 2011/0195284 A1 | 8/2011 | Yasui et al. | |

FOREIGN PATENT DOCUMENTS

| | | | |
|---|---|---|---|
| CN | 1881654 | A | 12/2006 |
| CN | 101728584 | A | 6/2010 |
| JP | 2001-155702 | A | 6/2001 |
| JP | 2001155702 | A * | 6/2001 |
| JP | 2004-095357 | A | 3/2004 |
| JP | 2004-179085 | A | 6/2004 |
| JP | 2010-113455 | A | 5/2010 |
| WO | WO 2010/019503 | A2 | 2/2010 |
| WO | WO 2010/113455 | A1 | 10/2010 |

OTHER PUBLICATIONS

Machine Translation in English of JP 2001155702.*

* cited by examiner

*Primary Examiner* — Miriam Stagg
*Assistant Examiner* — Haroon S Sheikh
(74) *Attorney, Agent, or Firm* — Finnegan, Henderson, Farabow, Garrett & Dunner, LLP

(57) ABSTRACT

The present disclosure provides a battery module comprising: a battery pack having at least one single battery and at least one power splicer; a sampling module having a flexible circuit board, wherein at least one voltage sampling terminal and temperature sensor are disposed on the flexible circuit board, the temperature sensor being connected with the power splicer, the voltage sampling terminal being electrically connected with the power splicer; and a shell to enclose the battery pack and the sampling module.

14 Claims, 5 Drawing Sheets

BATTERY MODULE

CROSS-REFERENCE TO RELATED APPLICATION

This application claims priority to and benefits of Chinese Patent Application No. 201010581609.4, filed with the State Intellectual Property Office, P.R.C. on Dec. 8, 2010, the content of which is incorporated herein by reference in its entirety.

TECHNICAL FIELD

The present disclosure relates to a power battery, and more particularly to a battery module.

BACKGROUND

With the exhaustion of oil and growing requirement of environmental protection, present gasoline vehicles may be gradually replaced by electric vehicles or hybrid vehicles, which is becoming a certain trend. Therefore, the battery module, as the core energy source of electric vehicles, may become more and more important.

The battery module for electric vehicles needs to have high capability, which may simultaneously bring problems such as large volumes and complex structures. Besides, the battery module may usually contain hundreds of single batteries in series, resulting in complex connecting structures, which may be a difficult problem to solve.

In order to ensure the safety of the power battery, a sampling module is an important member equipped to monitor the temperature of each single battery. At present, the sampling module may adopt the traditional wiring harness connecting pattern, in which the wiring harnesses are directly connected with a single battery to collect and transduce signals. The traditional manner may require complex assembly, making it difficult for automated production and susceptible to errors or leakage during assembly. Finally, the wiring harnesses need special fixing device with complex structures, and the wire sheath may be prone to abrasion and leakage.

Therefore, a battery module may be needed with a simple structure, a simple sampling module, and high capacity and safety performance.

SUMMARY

A battery module with high capacity as well as a simple structure and a simple sampling module may be provided. The battery module may be easily assembled and have good safety performance.

According to the present disclosure, a battery module comprises:
  a battery pack having at least one single battery and at least one power splicer to connect the single battery;
  and a sampling module having a flexible circuit board and a protective member, wherein:
  at least one voltage sampling terminal and at least one temperature sensor are disposed on the flexible circuit board, the temperature sensor being connected with the power splicer, and the voltage sampling terminal being electrically connected with the power splicer; the protective member comprises an external insulating layer (a first insulating layer) covering the surface of the flexible circuit board, and an inner insulating layer (a second insulating layer) covering between the power splicer and the single battery.

The battery module according to the present disclosure further comprises a shell to enclose the battery pack and the sampling module.

Compared with a battery module with the traditional sampling structure, the battery module provided herein may have the following advantages.

1. According to the present disclosure, the connection between the temperature sensor and the voltage sampling terminal may be achieved via the flexible circuit board. Rather than using the traditional wiring harness connecting manner, the battery module adopting the flexible circuit board may be easily assembled and have a small volume; the assembly process may be easily controlled with high precision.

2. In the battery module according to the present disclosure, each member is covered and fixed with an inner insulating layer or an external insulating layer, which may be easily achieved, effectively protect the flexible circuit board, and prevent the circuit from leakage caused by the abrasion of the wire sheath.

3. The battery module according to the present disclosure has higher reliability and adaptability to automated production, and may further satisfy the connection requirement of sampling modules in the art.

DESCRIPTION OF THE EMBODIMENTS

Figure 1:
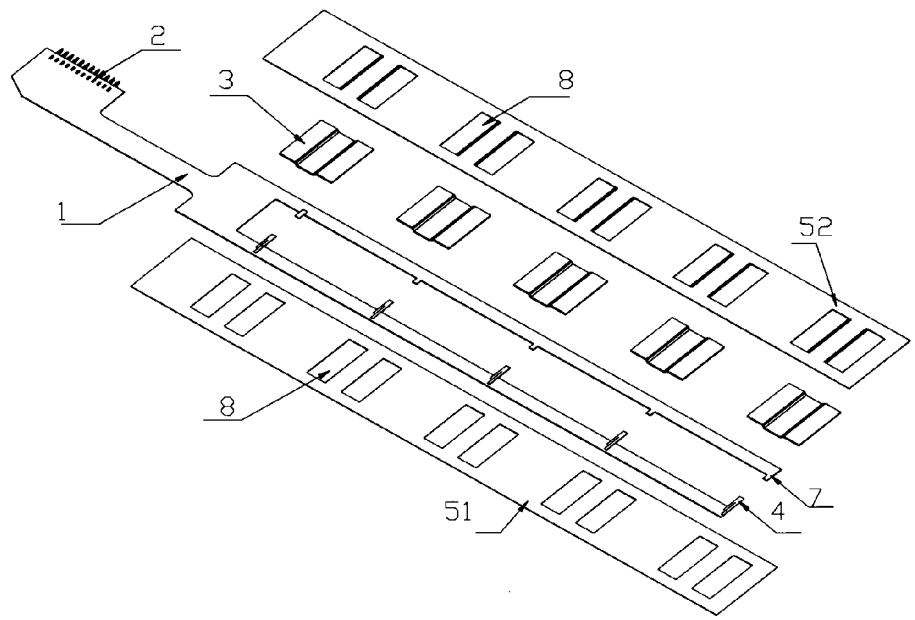
FIG. 1 shows the connection between each member of a battery module according to an embodiment of the present disclosure.

Reference will be made in detail to embodiments of the present disclosure. The embodiments described herein are explanatory and illustrative, which are used to generally understand the present disclosure. The embodiments shall not be construed to limit the present disclosure.

A battery module according to the present disclosure, comprises:
  a battery pack 100 having at least one single battery 6 and at least one power splicer 3 to connect with the single battery 6;
  a sampling module having a flexible circuit board 1 and a protective member, wherein at least one voltage sampling terminal 7 and at least one temperature sensor 4 are disposed on the flexible circuit board 1, the temperature sensor 4 being connected with the power splicer 3, and the voltage sampling terminal 7 being electrically connected with the power splicer 3; the protective member comprises an external insulating layer (a first insulating layer) 51 covering the surface of the flexible circuit board 1, and an inner insulating layer (a second insulating layer) 52 covering between the power splicer 3 and the single battery 6;

and a shell 300 to contain enclose the battery module pack 100 and the sampling module.

Figure 3:
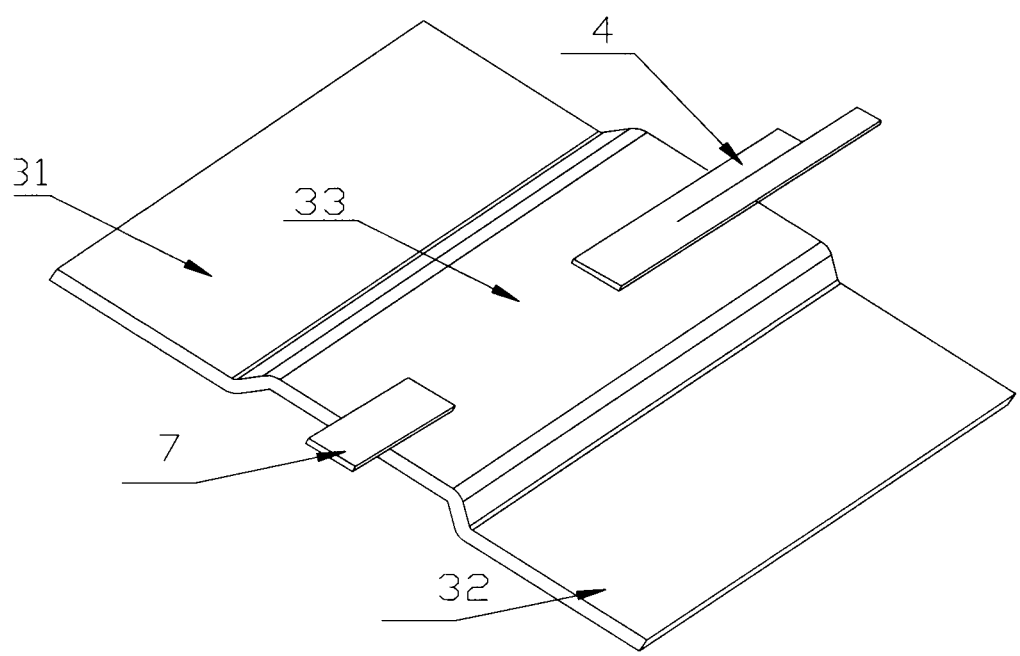
FIG. 3 shows the structure of a power splicer according to an embodiment of the present disclosure.
Figure 4:
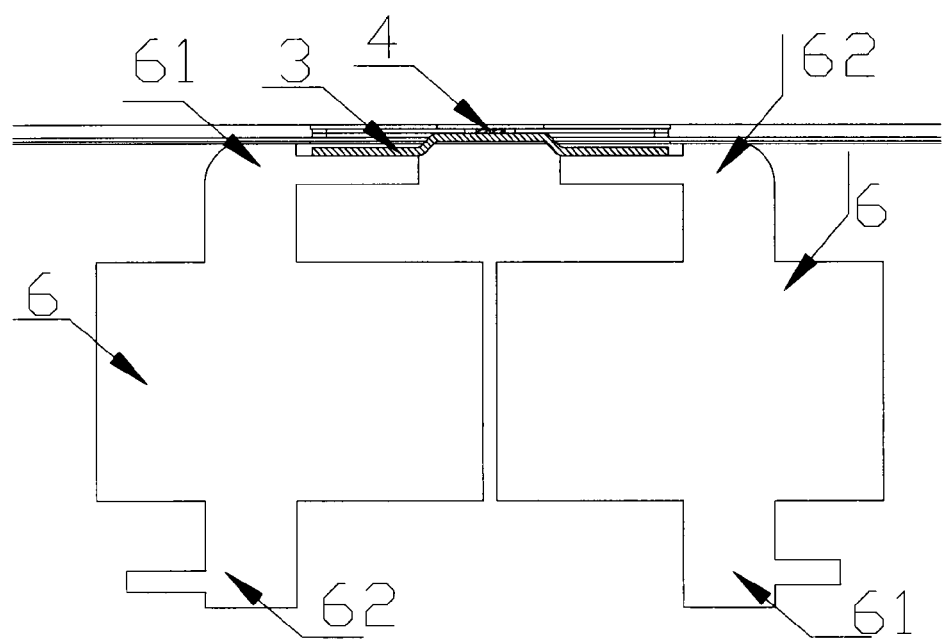
FIG. 4 shows the connection between a power splicer and a single battery according to an embodiment of the present disclosure.

The single battery 6 according to some embodiments of the present disclosure is shown in FIG. 4. A positive terminal 61 and a negative terminal 62 are respectively mounted on end-faces of the single battery 6. The at least one single batteries 6 are disposed in parallel to each other. The positive terminal 61 and the negative terminal 62 of adjacent single batteries 6 may be arranged in an alternating manner, and connected in turn via the power splicer 3. Accordingly, the single battery 6 and the power splicer 3 are connected in series. As shown in FIG. 3, in some embodiments of the present disclosure, the power splicer 3 has a first connective terminal 31, a second connective terminal 32 and a main part 33. One end of the temperature sensor 4 and the voltage sampling terminal 7 are connected with the main part 33, and the first and second connective terminals 31 and 32 are connected with the positive and negative terminals 61 and 62 of the adjacent single battery 6, respectively. In some embodiments of the present disclosure, in order to ensure good conductivity of the sampling module, the power splicer 3 and the voltage sampling terminal 7 may be connected via a solder joint; in order to reduce the temperature differences, the temperature sensor 4 and the power splicer 3 may be fixed together with an adhesive having high thermal conductivity, such as thermal-conductive silicone rubber.

As shown in FIG. 1, the other end of the temperature sensor 4 and the voltage sampling terminal 7 are connected with the flexible circuit board 1. According to one embodiment of the present disclosure, in order to ensure good conductivity and signal transduction between the temperature sensor 4, the voltage sampling terminal 7 and the flexible circuit board 1, the temperature sensor 4 and the flexible circuit board 1, as well as the voltage sampling terminal 7 and the flexible circuit 1, are connected via a solder joint.

It shall be noted that the solder joint between each member represents just one example of the connecting manner. Other connecting manner in the art could also be chosen if the welding material adopted has good electrical conductivity.

In some embodiments of the present disclosure, at one end of the flexible circuit board 1, a connector 2 is disposed and connected with an outside monitor equipment. In some embodiments, the connector 2 may be a general signal transduction interface.

Figure 2:
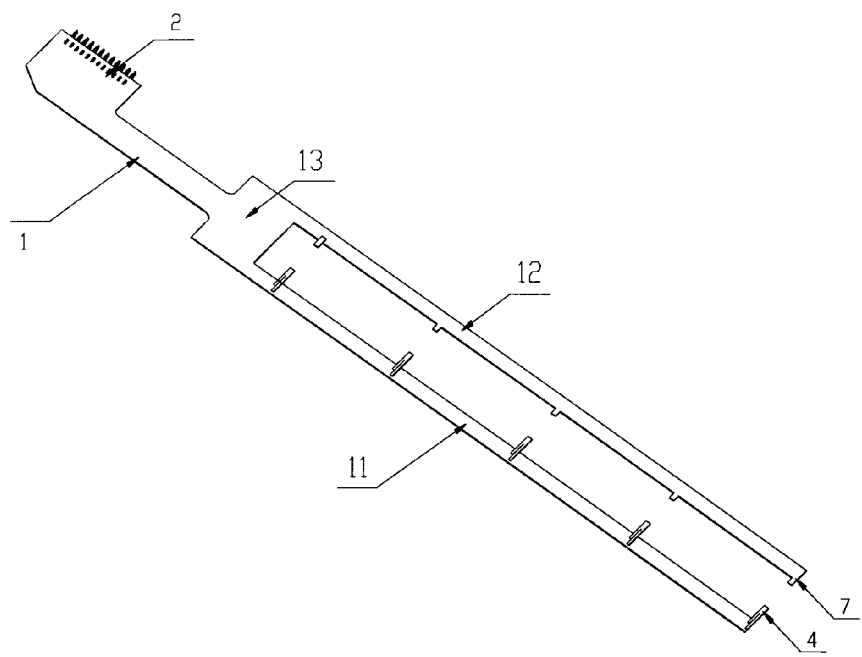
FIG. 2 shows the structure of a flexible circuit board according to an embodiment of the present disclosure.

As shown in FIG. 2, according to one embodiment of the present disclosure, the flexible circuit board 1 may have a temperature collecting arm 11, a voltage collecting arm 12 and a connective member 13. The temperature sensor 4 and the voltage sampling terminal 7 are connected with the temperature collecting arm 11 and the voltage collecting arm 12, respectively. In some embodiments, the power splicer 3 may be disposed in the space between the voltage collecting arm 12 and the temperature collecting arm 11.

The external insulating layer 51 covers the surface of the flexible circuit board 1, and the inner insulating layer 52 is wrapped between the power splicer 3 and the single battery 6. In some embodiments, the inner insulating layer 52 and the external insulating layer 51 may cooperatively wrap around the power splicer 3, the temperature sensor 4, the voltage sampling terminal 7 and the flexible circuit board 1.

In some embodiments of the present disclosure, both of the inner and external insulating layers 51 and 52 could be made of flexible polyethylene terephthalate (PET) material with good insulating ability. Accordingly, the adhesive adopted to connect the power splicer 3 may have good thermal and chemical stability, and high jointing strength with metal. In some embodiments, the temperature sensor 4 may include lamellar structures with thermal resistance.

According to one embodiment of the present disclosure, in order to simplify the assembly of the battery module, the first and the second connective terminals 31 and 32 of the power splicer 3 may be electrically connected with the single battery 6, and at least one aperture 8 may be formed on the inner and the external insulating layers 51 and 52 to facilitate welding of the first and second connective terminals 31 and 31 of the power splicer 3 to the single battery 6.

Figure 5:
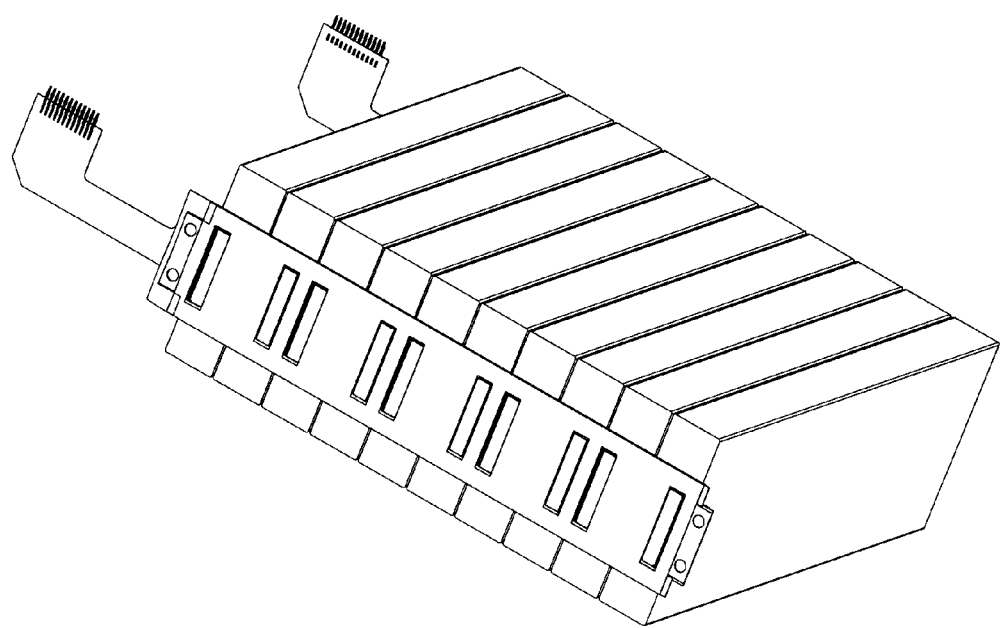
FIG. 5 shows a battery module according to an embodiment of the present disclosure.

According to one embodiment of the present disclosure, the positive and the negative terminals 61 and 62 are respectively mounted on two ends of the single battery 6, and therefore, the finished battery module has a structure shown in FIG. 5. In some other embodiments, the positive terminal 61 and the negative terminal 62 may also be mounted on the same end of the single battery 6.

Figure 6:
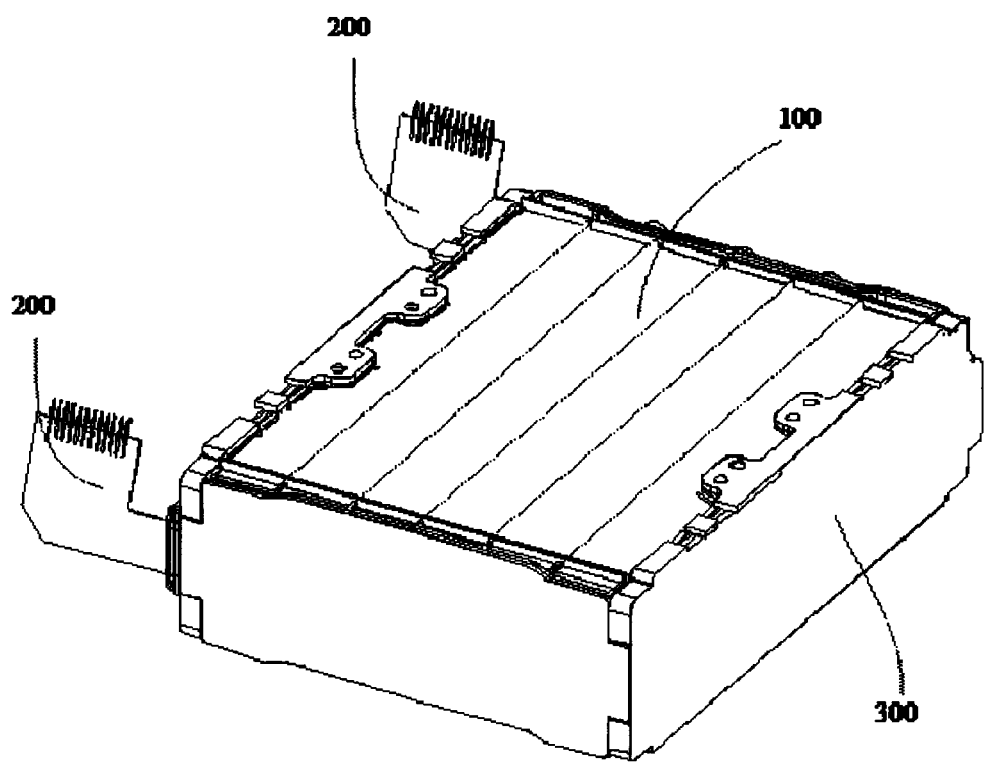
FIG. 6 shows a perspective view of a battery module with a shell according to an embodiment of the present disclosure

According to one embodiment, the structure of the battery module with a shell is shown in FIG. 6, the battery pack 100 may be installed easily inside the shell 300, while the connector 200 extending to the outside of the shell 300. It should be noted that the structure of the shell 300 of the battery module as well as the using and assembling method of the shell 300 may be well known in the art, and, therefore, a detailed description is not necessary.

Although explanatory embodiments have been shown and described, it would be appreciated by those skilled in the art that changes, alternatives, and modifications may be made in the embodiments without departing from the spirit and principles of the disclosure. Such changes, alternatives, and modifications all fall into the scope of the claims and their equivalents.

What is claimed is:

1. A battery module, comprising:
    a battery pack comprising at least one single battery and at least one power splicer to connect the at least one single battery;
    a sampling module comprising a flexible circuit board, wherein at least one voltage sampling terminal and at least one temperature sensor are disposed on the flexible circuit board, the temperature sensor being connected with the power splicer, and the voltage sampling terminal being electrically connected with the power splicer; and
    a shell for enclosing the battery pack and the sampling module,
    wherein the flexible circuit board comprises:
        a voltage collecting arm electrically connected with the voltage sampling terminal;
        a temperature collecting arm with the temperature sensor disposed thereon; and
        a connective arm to connect the voltage collecting arm and the temperature collecting arm, the power splicer being disposed in the space between the voltage collecting arm and the temperature collecting arm.

2. The battery module according to claim 1, wherein the power splicer comprises:
    a main part connected with a first end of the temperature sensor and the voltage sampling terminal; and
    a first connective terminal and a second connective terminal connected with the single battery.

3. The battery module according to claim 1, wherein the sampling module comprises a connector on the flexible circuit board.

4. The battery module according to claim 1, wherein at least one aperture is formed on the external and inner insulating layers to facilitate welding of a first and a second connective terminals of the power splicer to the single battery.

5. The battery module according to claim 1, wherein the temperature sensor is fixed on and insulated from the power splicer.

6. The battery module according to claim 1, wherein the external insulating layer and the inner insulating layer are made of PET.

7. The battery module according to claim 1, wherein the temperature sensor is fixed on the power splicer with an adhesive.

8. The battery module according to claim 1, wherein the power splicer and the voltage sampling terminal are connected via a solder joint.

9. The battery module according to claim 1, wherein the single battery comprises a positive terminal and a negative terminal, a first and a second connective terminals of the power splicer being connected with the positive and negative terminals of adjacent single batteries, respectively.

10. The battery module according to claim 1, wherein the sampling module further comprises a protective member disposed on the flexible circuit board to insulate the flexible circuit board from the power splicer.

11. The battery module according to claim 10, wherein the protective member comprises an external insulating layer covering the flexible circuit board, and an inner insulating layer covering between the power splicers and the single batteries.

12. A battery module, comprising:
a battery pack,
a sampling module, and
a shell,
wherein the battery pack comprises a plurality of batteries and a plurality of power splicers to connect adjacent batteries; the battery pack and the sampling module are enclosed in the shell; and
wherein the sampling module comprises a protective member, and a flexible circuit board, the flexible circuit board comprising a plurality of temperature sensors and a plurality of voltage sampling terminals, the temperature sensors being connected with the power splicers, and the voltage sampling terminals being electrically connected with the power splicers; and
wherein the protective member comprises an external insulating layer covering the surface of the flexible circuit board, and an inner insulating layer covering between the power splicers and the batteries,
wherein the flexible circuit board comprises:
a connective arm;
a voltage collecting arm electrically connected with the voltage sampling terminal; and
a temperature collecting arm with the temperature sensor disposed thereon.

13. The battery module according to claim 12, wherein
the power splicer comprises a first connective terminal and a second connective terminal, and a main part to fix the temperature sensor and the voltage sampling terminal thereon;
the battery comprises a positive terminal and a negative terminal, a first and a second connective terminals of the power splicer being connected with the positive and negative terminals of adjacent batteries, respectively.

14. The battery module according to claim 12, wherein the sampling module comprises a connector exposed from one end of the battery module.

* * * * *